United States Patent
Kojima

(10) Patent No.: US 10,815,696 B2
(45) Date of Patent: Oct. 27, 2020

(54) ROBOT, ROBOT SYSTEM, AND ROBOT CONTROL APPARATUS

(71) Applicant: Seiko Epson Corporation, Tokyo (JP)

(72) Inventor: Takashi Kojima, Matsumoto (JP)

(73) Assignee: Seiko Epson Corporation (JP)

( * ) Notice: Subject to any disclaimer, the term of this patent is extended or adjusted under 35 U.S.C. 154(b) by 240 days.

(21) Appl. No.: 15/717,005

(22) Filed: Sep. 27, 2017

(65) Prior Publication Data
US 2018/0087292 A1    Mar. 29, 2018

(30) Foreign Application Priority Data
Sep. 29, 2016    (JP) ................. 2016-191266

(51) Int. Cl.
| | |
|---|---|
| H02J 7/34 | (2006.01) |
| B25J 19/00 | (2006.01) |
| E05B 47/02 | (2006.01) |
| B25J 9/04 | (2006.01) |
| H02J 9/06 | (2006.01) |

(52) U.S. Cl.
CPC ............ *E05B 47/023* (2013.01); *B25J 9/044* (2013.01); *B25J 19/00* (2013.01); *H02J 7/345* (2013.01); *H02J 9/061* (2013.01)

(58) Field of Classification Search
CPC .......... B25J 9/044; E05B 47/023; H02J 9/061
See application file for complete search history.

(56) References Cited

U.S. PATENT DOCUMENTS

| | | | | |
|---|---|---|---|---|
| 2006/0071622 A1* | 4/2006 | Townsend | ........... | C25D 11/02 318/400.31 |
| 2007/0166610 A1* | 7/2007 | Nakashima | ........... | H01M 10/44 429/128 |
| 2009/0307854 A1* | 12/2009 | Garti | ........... | E04H 4/1654 15/1.7 |
| 2010/0130986 A1* | 5/2010 | Mailloux | ........... | A61B 34/30 606/130 |
| 2010/0263948 A1* | 10/2010 | Couture | ........... | B62D 55/065 180/8.2 |
| 2013/0221888 A1* | 8/2013 | Horikoshi | ........... | H02P 27/06 318/400.29 |
| 2016/0362078 A1* | 12/2016 | Hayashi | ........... | H02J 7/34 |
| 2017/0371342 A1* | 12/2017 | Hashimoto | ........... | B25J 5/007 |
| 2019/0015922 A1* | 1/2019 | Inoue | ........... | B23K 9/1062 |

FOREIGN PATENT DOCUMENTS

JP    2002-218676 A    8/2002

OTHER PUBLICATIONS

Large Capacitor Replaces Backup Battery. (Jul. 9, 1998). Retrieved Dec. 19, 2019, from https://www.maximintegrated.com/en/design/technical-documents/app-notes/4/42.html. (Year: 1998).*

\* cited by examiner

*Primary Examiner* — Robert T Nguyen
(74) *Attorney, Agent, or Firm* — Harness, Dickey & Pierce, P.L.C.

(57) ABSTRACT

A robot includes a movable unit, a drive part that drives the movable unit, and a power supply part having an insulated power supply that supplies power to the drive part, wherein the drive part is provided in the movable unit.

5 Claims, 2 Drawing Sheets

ROBOT, ROBOT SYSTEM, AND ROBOT CONTROL APPARATUS

BACKGROUND

1. Technical Field

The present invention relates to a robot, a robot system, and a robot control apparatus.

2. Related Art

Research and development of technologies of suppressing reduction of lives when power supply is shut down and reduction of lives of respective members of robots are carried out.

In this regard, a motor driving apparatus including servo drive means for driving a servo motor based on a control signal obtained by feedback control of a rotation speed of the servomotor, a controller that gives an instruction to the servo drive means, power activation means for applying an alternating-current power supply, and power control means for controlling a main circuit power supply and a control power supply based on the power supply activation means, wherein the power control means includes a high-capacity capacitor having a capacity calculated from an amount of energy necessary for deceleration and stopping of load driven by the servo motor when a power failure is detected and supplying power supply voltages for the main circuit power supply and the control power supply when power fails, a first diode and a second diode that allow a higher voltage of the power supply voltage rectified by the power activation means and the voltage in the high-capacity capacitor to be supplied to the motor power supply voltage, a third diode that allows the control power supply to be supplied even when power supply is lost from the power activation means side when power fails, a smoothing capacitor that suppresses a power source ripple and accumulates regeneration energy from the servo motor, a first resistor for suppressing a charged current to the high-capacity capacitor, a second resistor for suppressing charged and discharged currents of the high-capacity capacitor, and a transistor as a discharge means for a residual voltage of the high-capacity capacitance is known (see Patent Document 1 (JP-A-2002-218676)).

When power supply from the alternating-current power supply is shut down at a power failure or the like, the motor driving apparatus cuts out a main circuit relay of the apparatus itself and directly couples motor terminals using a dynamic brake relay, and thereby, applies a brake and stops the motor. However, in the motor driving apparatus, load is applied to a reducer mechanically coupled to the motor due to deceleration by the generation brake, and thereby, the life of the reducer may be reduced. Further, the motor driving apparatus is integrally formed with a motor driver, and thereby, downsizing may be difficult. As a result, downsizing of a robot including the motor driving apparatus may be difficult.

SUMMARY

An aspect of the invention is directed to a robot including a movable unit, a drive part that drives the movable unit, and a power supply part having an insulated power supply that supplies power to the drive part, wherein the drive part is provided in the movable unit.

According to this configuration, in the robot, the power supply part has the insulated power supply that supplies power to the drive part driving the movable unit, and the drive part is provided in the movable unit. Thereby, the robot may be downsized.

In another aspect of the invention, the robot may be configured such that the power is equal to or lower than 1 kW.

According to this configuration, in the robot, the power supply part that supplies power equal to or lower than 1 kW to the drive part driving the movable unit has the insulated power supply, and the drive part is provided in the movable unit. Thereby, the robot may be downsized by downsizing of the insulated power supply.

In another aspect of the invention, the robot may be configured such that the robot includes a support unit on which the movable unit is provided, and the power supply part is provided in the support unit.

According to this configuration, in the robot, the power supply part is provided in the support unit in which the movable unit is provided. Thereby, in the robot, the support unit may be downsized by the size of the drive part compared to the case where the drive part and the power supply part are provided in the support unit.

In another aspect of the invention, the robot may be configured such that the robot includes a control part that controls the drive part, and the control part is provided in the support unit.

According to this configuration, in the robot, the control part is provided in the support unit. Thereby, in the robot, the support unit may be downsized by the size of the drive part compared to the case where the respective drive part, power supply part, and control part are provided in the support unit.

In another aspect of the invention, the robot may be configured such that the power supply part has a capacitor that supplies power to the drive part and the control part when the supply is shut down with a capacity equal to or larger than 1000 μF.

According to this configuration, in the robot, the power supply part has the capacitor with the capacity equal to or larger than 1000 μF that supplies power to the drive part and the control part when the power supply to the drive part is shut down. Thereby, in the robot, even when the power supply to the drive part is shut down, power may be supplied to the drive part and the control part from the capacitor.

In another aspect of the invention, the robot may be configured such that the power supply part has a first rectifier provided between the capacitor and the control part and allowing a current from the capacitor toward the control part.

According to this configuration, in the robot, the current is allowed to flow from the capacitor to the control part by the first rectifier. Thereby, in the robot, the backflow of the current flowing from the capacitor toward the control part may be suppressed.

In another aspect of the invention, the robot may be configured such that the power supply part has a second rectifier for preventing backflow of the current from the capacitor to the insulated power supply.

According to this configuration, in the robot, the backflow of the current flowing from the capacitor to the insulated power supply is prevented by the second rectifier. Thereby, in the robot, when power supply to the power supply part is shut down, compared to the case where the power supply part does not have the second rectifier, the power may be supplied from the capacitor to the control part more reliably.

In another aspect of the invention, the robot may be configured such that the drive part and the control part are connected to a common ground potential.

According to this configuration, in the robot, the drive part and the control part are connected to the common ground potential. Thereby, in the robot, power may be supplied to both the drive part and the control part from the capacitor.

In another aspect of the invention, the robot may be configured such that the support unit has a base, and the control part may be provided in the base.

According to this configuration, in the robot, the control part is provided in the base. Thereby, in the robot, the base may be downsized by the size of the drive part compared to the case where the drive part and the control part are provided in the base.

In another aspect of the invention, the robot may be configured such that the support unit has a first housing provided on the base, and the power supply part is provided in the first housing.

According to this configuration, in the robot, the power supply part is provided in the first housing. Thereby, in the robot, the base may be downsized by the size of the power supply part compared to the case where the power supply part and the control part are provided in the base.

In another aspect of the invention, the robot may be configured such that the movable unit includes an arm driven by an amplifier-integrated motor.

According to this configuration, in the robot, the movable unit includes the arm driven by the amplifier-integrated motor. Thereby, in the robot, the movable unit may be downsized compared to the case where the unit includes an arm driven by a motor separately provided from an amplifier.

Another aspect of the invention is directed to a robot system including the robot described above and a robot control apparatus that controls the robot.

According to this configuration, in the robot system, the power supply part has the insulated power supply that supplies power to the drive part driving the movable unit, and the drive part is provided in the movable unit. Thereby, in the robot system, the robot may be downsized.

Another aspect of the invention is directed to a robot control apparatus including a power supply part having an insulated power supply that supplies power to a drive part provided in a movable unit of a robot and driving the movable unit.

According to this configuration, in the robot control apparatus, the power supply part has the insulated power supply that supplies power to the drive part driving the movable unit, and the drive part is provided in the movable unit. Thereby, in the robot control apparatus, the robot may be downsized.

As described above, in the robot, the power supply part has the insulated power supply that supplies power to the drive part driving the movable unit, and the drive part is provided in the movable unit. Thereby, the robot may be downsized.

Further, in the robot system and the robot control apparatus, the power supply part has the insulated power supply that supplies power to the drive part driving the movable unit, and the drive part is provided in the movable unit. Thereby, in the robot system and the robot control apparatus, the robot may be downsized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

As below, an embodiment of the invention will be explained with reference to the drawings.
Configuration of Robot First, a configuration of a robot 1 will be explained.

Figure 1:
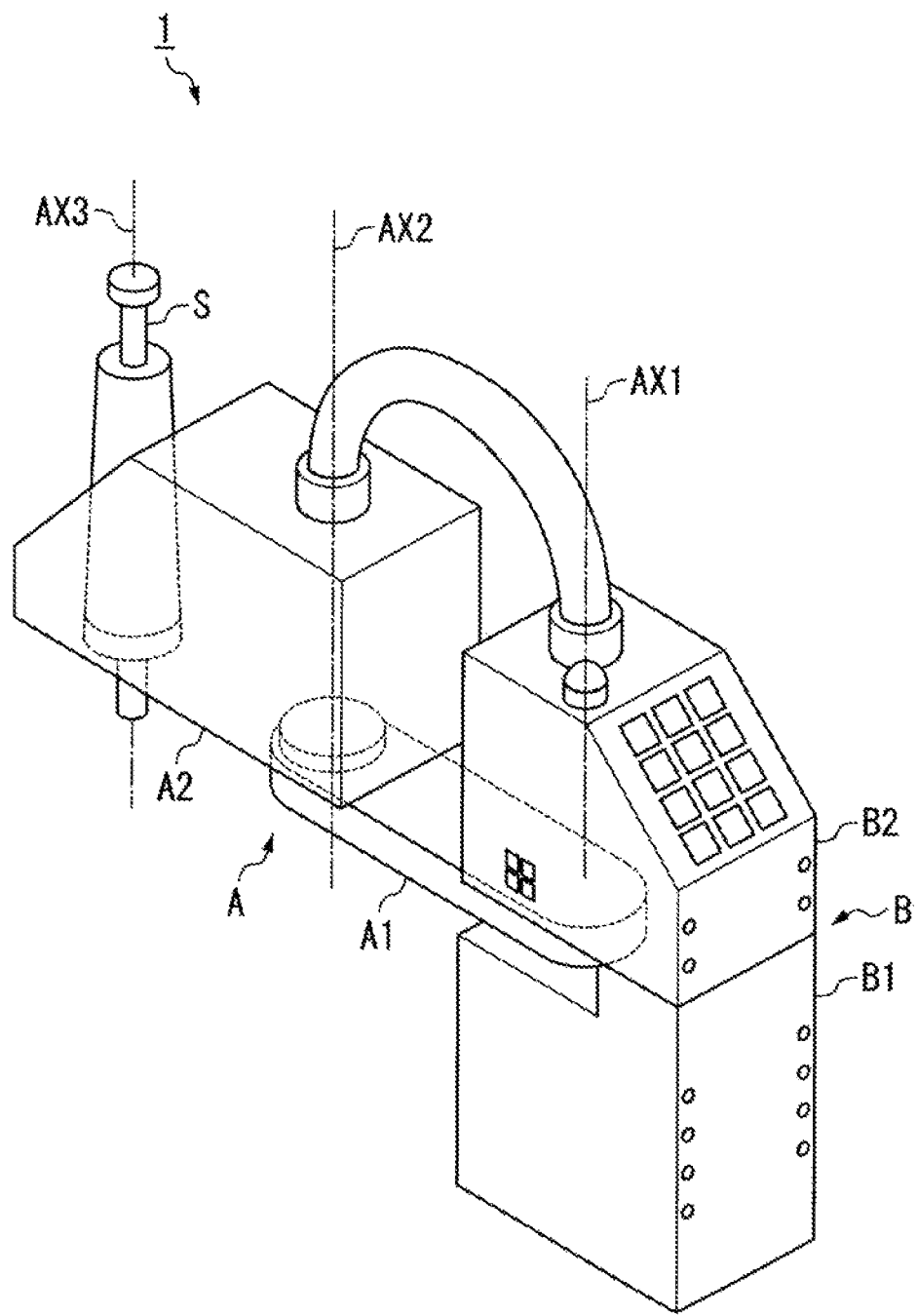
FIG. 1 shows an example of a configuration of a robot 1 according to an embodiment.

FIG. 1 shows an example of the configuration of the robot 1 according to the embodiment. The robot 1 is a scalar robot (horizontal articulated robot) including a support unit B and a movable unit A supported by the support unit B. Note that the robot 1 may be another robot such as a vertical articulated robot or Cartesian coordinate robot in place of the scalar robot. The vertical articulated robot may be a single-arm robot having a single arm, a dual-arm robot having two arms (multi-arm robot having two arms), or a multi-arm robot having three or more arms. Further, the Cartesian coordinate robot is e.g. a gantry robot.

The support unit B is formed by two parts. One of the parts is a base B1 and the other is a first housing B2. Note that the space inside of the base B1 connects to the space inside of the first housing B2.

The base B1 is installed on an installation surface such as a floor surface or wall surface. The base B1 has a nearly rectangular parallelepiped (or cubic) shape as an outer shape formed by plate-like surfaces, and is hollow. The first housing B2 is fixed to a first upper surface as a part of the upper surface of the base B1. The upper surface is an opposite surface to the installation surface of the surfaces of the base B1. Further, the distance between a second upper surface as the other part than the first upper surface of the upper surface of the base B1 and the installation surface is shorter than the distance between the first upper surface and the installation surface. Accordingly, a gap exists between the second upper surface and the first housing B2. Furthermore, the movable unit A is provided on the second upper surface. That is, the base B1 supports the movable unit A. Note that the shape of the base B1 may be another shape as long as the first housing B2 can be fixed to the part of the upper surface of the base B1 in place of the shape.

The first housing B2 has a shape as an outer shape formed by cutting off to remove a triangular part containing single vertexes in respective two surfaces opposed to each other and forming a rectangular parallelepiped (or cube) in a direction perpendicular to the two surfaces. Here, the shape without the cut off part is not necessarily formed by machining of cutting off the part, but may be directly formed by machining of forming the same shape, for example. The first housing B2 has the polygonal shape as the outer shape formed by plate-like surfaces, and is hollow. Note that the shape of the first housing B2 may be another shape as long as the first housing B2 can be fixed to the part of the upper surface of the base B1 in place of the shape.

The movable unit A includes a first arm A1 rotatably supported about a first axis AX1 by the base B1, a second arm A2 rotatably supported about a second axis AX2 by the first arm A1, and a shaft S rotationally supported about a third axis AX3 and translationally supported in the axis direction of the third axis AX3 by the second arm A2.

The shaft S is a cylindrical shaft member. A ball screw groove and a spline groove (not shown) are respectively formed in the circumferential surface of the shaft S. In the example, the shaft S is provided to penetrate the end portion opposite to the first arm A1 of the end portions of the second arm A2 in first directions as directions perpendicular to the installation surface on which the support unit B is installed. Further, an end effector can be attached to the end portion on the installation surface side of the end portions of the shaft S. The end effector maybe an end effector that can grasp an object, an end effector that can suction an object by air, a magnetic force, or the like, or another end effector.

In the example, the first arm A1 rotates about the first axis AX1 and moves in second directions. The second directions are directions orthogonal to the above described first directions. The second directions are e.g. directions along the XY-plane in the world coordinate system or robot coordinate system. The first arm A1 is rotated about the first axis AX1 by a first motor part 21 (not shown) of the support unit B. That is, the first axis AX1 is a rotation axis of the first motor part 21.

In the example, the second arm A2 rotates about the second axis AX2 and moves in the second directions. The second arm A2 is rotated about the second axis AX2 by a second motor part 22 (not shown) of the second arm A2. That is, the second axis AX2 is a rotation axis of the second motor part 22. Further, the second arm A2 includes a third motor part 23 and a fourth motor part 24 (not shown) and supports the shaft S. The third motor part 23 rotates a ball screw nut provided in the outer circumferential portion of the ball screw groove of the shaft S using a timing belt or the like, and thereby, moves the shaft S (upward and downward) in the first directions. The fourth motor part 24 rotates a ball spline nut provided in the outer circumferential portion of the spline groove of the shaft S using a timing belt or the like, and thereby, rotates the shaft S about the third axis AX3.

As below, as an example, the case where all of the respective first motor part 21 to fourth motor part 24 have the same configuration will be explained. Note that part or all of the first motor part 21 to fourth motor part 24 may be motors having configurations different from one another. As below, the respective first motor part 21 to fourth motor part 24 will be collectively referred to as "motor parts 2" unless the distinction among the motor parts is necessary.

Further, the robot 1 contains a part of the robot control apparatus 30 (not shown) in the space inside of the base B1, and contains the rest of the robot control apparatus 30 in the space inside of the first housing B2.

The robot control apparatus 30 is a controller that controls the robot 1. Note that the robot control apparatus 30 may be separately and externally attached to the robot 1 in place of the configuration provided inside of the robot 1. When separately and externally attached to the robot 1, the robot control apparatus 30 is communicably connected to the robot 1 in wired or wireless connection.

Further, when power supply to the robot control apparatus 30 is shut down by a power failure, disconnection, or the like, the robot control apparatus 30 brakes and stops the respective motor parts 2. In this regard, for example, the robot control apparatus 30 may directly couple the motor terminals of the motor parts 2 using dynamic brake relays, and thereby, apply regeneration brakes and stop the motor parts 2. However, in this case, the robot control apparatus 30 applies load to reducers mechanically coupled to the motor parts 2 due to deceleration by the generation brakes, and thereby, the lives of the reducers may be reduced.

Accordingly, in the robot control apparatus 30 in the example, when power supply to the robot control apparatus 30 is shut down, rotation of the rotation shafts of the motor parts 2 are braked by mechanical brakes mechanically coupled to the motor parts 2 using regeneration currents of the motor parts 2. Then, when the rotation speeds of the rotation shafts of the motor parts 2 reach less than a predetermined speed, the robot control apparatus 30 directly couples the motor terminals of the motor parts 2 using dynamic brake relays of the motor parts 2. Thereby, the robot control apparatus 30 suppresses the load on the reducers mechanically coupled to the motor parts 2 and, as a result, may suppress the reduction of the lives of the reducers. As below, a configuration of a power supply circuit of the robot 1 for processing of braking the rotation of the rotation shafts of the motor parts 2 by robot control apparatus 30 will be explained.

Configuration of Power Supply Circuit of Robot

Figure 2:
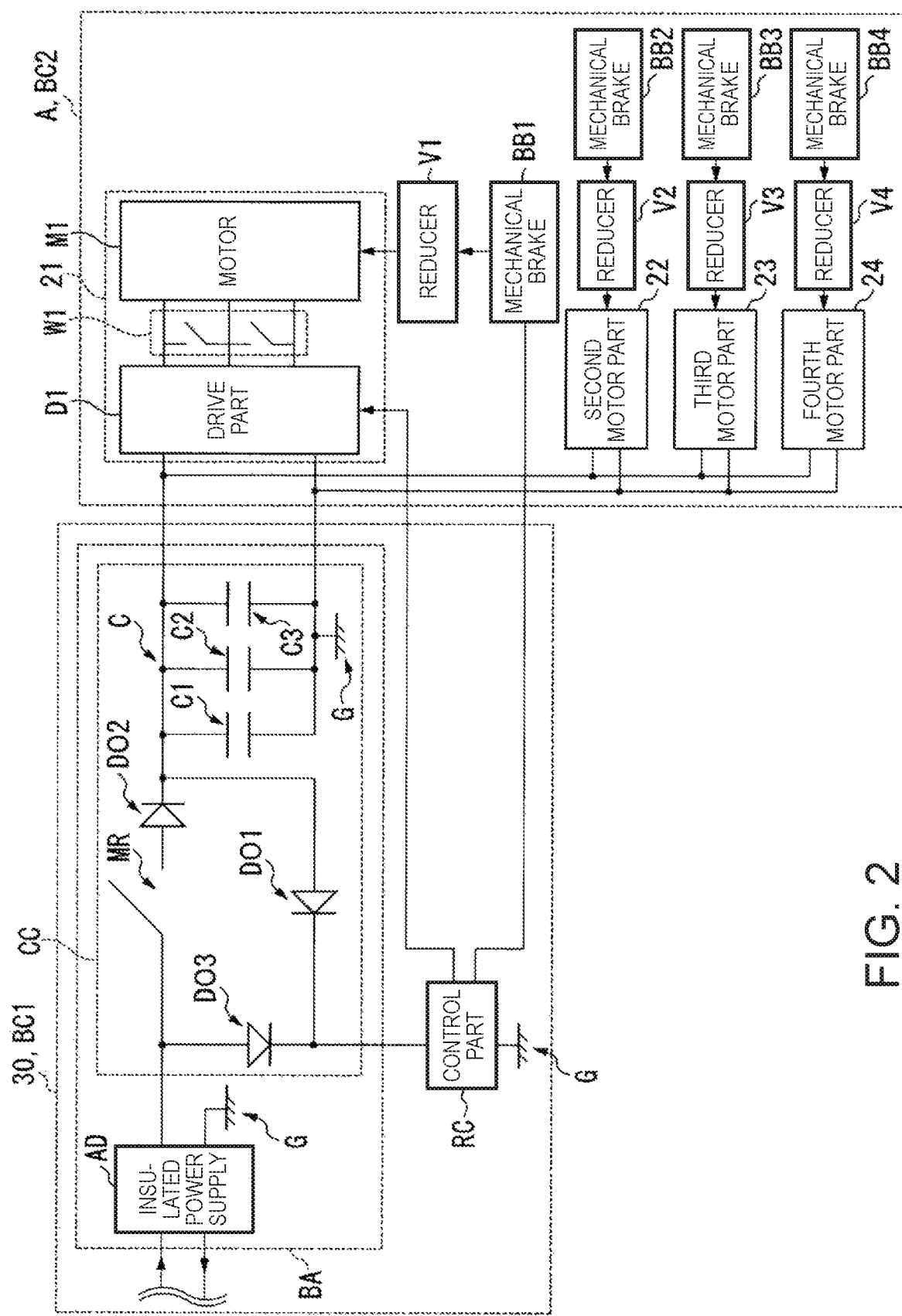
FIG. 2 shows an example of a configuration of a power supply circuit.

As below, referring to FIG. 2, the configuration of the power supply circuit will be explained. FIG. 2 shows an example of the configuration of the power supply circuit. Note that, in FIG. 2, the other circuits than the power supply circuit of the robot 1 are omitted.

As shown in FIG. 2, the power supply circuit includes a first partial circuit BC1 of the robot control apparatus 30 and a second partial circuit BC2 of the movable unit A.

The first partial circuit BC1 has a power supply part BA and a control part RC. Further, the power supply part BA has an insulated power supply AD and a power holding circuit CC. Here, in the example, the power supply part BA is provided in (the space inside of) the above described first housing B2, and the control part RC is provided in (the space inside of) the above described base B1. Thereby, the robot 1 may be downsized compared to the case where both the power supply part BA and the control part RC are collectively provided in (the space inside of) either the base B1 or first housing B2. Note that the power supply part BA may be provided in (the space inside of) the base B1. Further, the control part RC may be provided in (the space inside of) the first housing B2. Or, both the power supply part BA and the control part RC may be collectively provided in (the space inside of) either the base B1 or first housing B2.

The insulated power supply AD is a power supply in which, of the circuits inside of the insulated power supply AD, the circuit on the input side as the side of the apparatus that supplies power to the insulated power supply AD and the circuit on the output side as the side of the apparatus supplied with power by the insulated power supply AD are not electrically connected (i.e., insulated) by an insulating transformer or the like, e.g. an AC/DC converter having an insulating transformer.

The power that can be supplied by the insulated power supply AD is equal to or lower than 1 kW. When the power that can be supplied by the insulated power supply AD is equal to or lower than 1 kW, compared to an insulated power supply that can supply power higher than 1 kW or an uninsulated power supply using a bridge or the like, the insulated power supply AD may be downsized. As a result, the robot 1 including the insulated power supply AD may be downsized by the smaller size of the insulated power supply AD than the insulated power supply that can supply power higher than 1 kW or uninsulated power supply using a bridge or the like. The insulated power supply AD may be made smaller than the insulated power supply that can supply power higher than 1 kW because the insulating transformer of the insulated power supply AD can be made smaller than the insulating transformer of the insulated power supply that can supply power higher than 1 kW.

The insulated power supply AD is connected to a ground G. The ground G is a ground at a ground potential G0. Note that the insulated power supply AD may be another power supply such as a DC/DC converter including an insulating transformer in place of the AC/DC converter. When the insulated power supply AD is the DC/DC converter, the first partial circuit BC1 includes a power supply that converts an alternating current into a direct current separately from the insulated power supply AD.

The direct current output from the insulated power supply AD is supplied to the power holding circuit CC.

The power holding circuit CC has a main circuit relay MR, a first rectifier DO1, a second rectifier DO2, a third rectifier DO3, and a capacitor part C. Further, the power holding circuit CC has three paths of a first path, a second path, and a third path. The first path is a path connecting between the insulated power supply AD and the capacitor part C. The second path is a path connecting the insulated power supply AD and the control part RC. The third path will be described later.

The direct current supplied from the insulated power supply AD flows in the first path and is supplied to the motor parts 2 of the movable unit A, and flows in the second path and is supplied to the control part RC.

In the first path, the main circuit relay MR, the second rectifier DO2, and the capacitor part C are respectively provided sequentially from the insulated power supply AD side between the insulated power supply AD and the motor parts 2.

The main circuit relay MR is a relay switch that shuts down the power supply to the motor parts 2 from the insulated power supply AD by cutting off the electrical connection between the insulated power supply AD and the second rectifier DO2 according to a signal output from the control part RC when a shut-down of the power supply to the robot control apparatus 30 occurs.

The second rectifier DO2 prevents the backflow of the direct current flowing from the insulated power supply AD to the motor parts 2. The second rectifier DO2 is e.g. a diode. Note that the second rectifier DO2 may be another electronic component that prevents the backflow such as an FET (Field Effect Transistor) in place of the diode.

The capacitor part C has one or more electrolytic capacitors having a total capacity equal to or larger than 1000 μF. As below, as an example, the case where the capacitor part C has an electrolytic capacitor C1, an electrolytic capacitor C2, and an electrolytic capacitor C3 as three respective electrolytic capacitors having a total capacity equal to or larger than 1000 μF will be explained. Further, the capacitor part C is connected to the ground G. That is, the ground potential to which the capacitor part C is connected is the same ground potential as the ground potential to which the insulated power supply AD is connected (i.e., potential G0). Note that part or all of the three electrolytic capacitors of the capacitor part C may be other capacitors such as ceramic capacitors in place of the electrolytic capacitors.

When a shut-down of the power supply to the robot control apparatus 30 occurs, the three electrolytic capacitors of the capacitor part C discharge and supply the accumulated charge to the control part RC, and activate the control part RC for a time according to the charge. That is, the electrolytic capacitors hold the power to be supplied to the control part RC in the case. Further, in the example, the electrolytic capacitors are used for waveform shaping of the direct current in PWM (Pulse With Modulation) control of the motor parts 2.

When a shut-down of the power supply to the robot control apparatus 30 does not occur, the three electrolytic capacitors of the capacitor part C are charged by at least part of the direct current supplied from the insulated power supply AD. Further, when a shut-down of the power supply to the robot control apparatus 30 occurs, the electrolytic capacitors are charged by the regeneration currents of the motor parts 2. The regeneration currents are currents generated when the power supply to the motor parts 2 is shut down during the rotation of the rotation shafts of the motor parts 2 by the rotation of the inertia by the rotation shafts.

Here, the respective second rectifier DO2 and capacitor part C are provided in the first path, and thereby, when the power supply to the robot control apparatus 30 is shut down, the robot 1 may supply power to the control part RC from the respective electrolytic capacitors of the capacitor part C more reliably compared to the case where the power supply part BA does not have the second rectifier DO2.

In the second path, the third rectifier DO3 is provided between the insulated power supply AD and the control part RC. The third rectifier DO3 prevents the backflow of the direct current from the insulated power supply AD to the control part RC. The third rectifier DO3 is e.g. a diode. Note that the third rectifier DO3 may be another electronic component that prevents the backflow such as an FET in place of the diode.

The third path is a path that short-circuits between the second rectifier DO2 and the capacitor part C of the first path and between the third rectifier DO3 and the control part RC of the second path. In the third path, the first rectifier DO1 is provided between the capacitor part C and the control part RC.

When a shut-down of the power supply to the robot control apparatus 30 occurs, the first rectifier DO1 allows currents to flow from the respective electrolytic capacitors of the capacitor part C toward the control part RC. The first rectifier DO1 is e.g. a diode. Note that the first rectifier DO1 may be another electronic component that prevents the backflow such as an FET in place of the diode. The first rectifier DO1 is provided in the third path, and thereby, the robot 1 may suppress the backflow of the currents flowing from the respective electrolytic capacitors of the capacitor part C toward the control part RC.

The control part RC is a control circuit that controls the motor parts 2. When a shut-down of the power supply to the robot control apparatus 30 does not occur, power is supplied from the insulated power supply AD to the control part RC. Further, when a shut-down of the power supply to the robot control apparatus 30 occurs, power is supplied from the respective electrolytic capacitors of the capacitor part C to the control part RC. The control part RC is activated by the power supplied from the respective electrolytic capacitors in the case, and operates the mechanical brakes that brake the rotation of the rotation shafts of the motor parts 2. Thereby, the control part RC brakes the rotation of the rotation parts. Then, when the rotation speeds of the rotation parts reach less than the predetermined speed, the control part RC directly couples the motor terminals of the motor parts 2 using the dynamic brake relays of the motor parts 2. The rotation of the rotation shafts of the motor parts 2 with the directly coupled motor terminals is stopped by the regeneration brakes. Thereby, the control part RC suppresses the load on the reducers mechanically coupled to the motor parts 2 and, as a result, may suppress the reduction of the lives of the reducers. Further, the control part RC is connected to the ground G. That is, the ground potential to which the control part RC is connected is the same ground potential as the ground potential to which the insulated power supply AD is connected and the ground potential to which the capacitor part C is connected (i.e., potential G0).

The second partial circuit BC2 provided in the movable unit A has the motor parts 2, i.e., the respective first motor part 21 to fourth motor part 24. In the example, the configurations of the circuits inside of the respective first motor part 21 to fourth motor part 24 are the same. Accordingly, in the example shown in FIG. 2, only the configuration of the circuit inside of the first motor part 21 is shown, but the configurations of the circuits inside of the respective second motor part 22 to fourth motor part 24 are omitted.

The first motor part 21 is an amplifier-integrated motor having a motor M1, a drive part D1, and a dynamic brake relay W1.

The motor M1 is a servo motor. The motor M1 is driven by the drive part D1. In the state in which the motor M1 is provided in the robot 1, the rotation shaft of the motor M1 is respectively coupled to a reducer V1 that reduces the rotation speed of the rotation shaft and a mechanical brake BB1 that brakes the rotation of the rotation shaft.

The drive part D1 is an amplifier having a drive circuit (motor driver) that drives the motor M1. The drive part D1 is controlled by the above described control part RC. Here, hereinafter, for convenience of explanation, the terminal connected to the ground G of the two terminals of the respective electrolytic capacitors of the capacitor part C is referred to as "negative terminal" and the terminal not the negative terminal of the two terminals is referred to as "positive terminal".

The respective positive terminals and negative terminals of the respective electrolytic capacitors of the capacitor part C are electrically connected to the drive part D1. Thereby, power is supplied to the drive part D1 from the insulated power supply AD. Further, when the power supply to the robot control apparatus 30 is shut down, power is supplied to the drive part D1 from the respective electrolytic capacitors. Thereby, the drive part D1 is connected to the ground G. That is, the ground potential to which the drive part D1 is connected is the same ground potential as the ground potential to which the insulated power supply AD is connected, the ground potential to which the capacitor part C is connected, and the ground potential to which the control part RC is connected (i.e., potential G0). The drive part D1 rotates the rotation shaft of the motor M1 according to a signal output from the control part RC. The drive part D1 is electrically connected to the motor M1 by three conductor wires. The respective conductor wires are connected to the motor terminals of the motor M1. Then, the dynamic brake relay W1 is provided in the conductor wires.

The dynamic brake relay W1 is a relay switch that directly couples between the motor terminals of the motor M1 by directly coupling the respective three conductor wires that electrically connect the drive part D1 and the motor M1 to one another according to the signal output from the control part RC.

For example, the mechanical brake BB1 brakes the rotation of the rotation shaft by friction generated by holding a brake disc attached to the rotation shaft of the motor M1 with brake pads. The mechanical brake BB1 brakes the rotation of the rotation shaft of the motor M1 according to the signal output from the control part RC. Note that the mechanical brake BB1 may brakes the rotation of the rotation shaft by another method instead.

The second motor part 22 is an amplifier-integrated motor having a motor M2, a drive part D2, and a dynamic brake relay W2.

The motor M2 is a servo motor. The motor M2 is driven by the drive part D2. In the state in which the motor M2 is provided in the robot 1, the rotation shaft of the motor M2 is respectively coupled to a reducer V2 that reduces the rotation speed of the rotation shaft and a mechanical brake BB2 that brakes the rotation of the rotation shaft.

The drive part D2 is an amplifier having a drive circuit (motor driver) that drives the motor M2. The drive part D2 is controlled by the control part RC. The respective positive terminals and negative terminals of the respective electrolytic capacitors of the capacitor part C are electrically connected to the drive part D2. Thereby, power is supplied to the drive part D2 from the insulated power supply AD. Further, when the power supply to the robot control apparatus 30 is shut down, power is supplied to the drive part D2 from the respective electrolytic capacitors. Thereby, the drive part D2 is connected to the ground G. That is, the ground potential to which the drive part D2 is connected is the same ground potential as the ground potential to which the insulated power supply AD is connected, the ground potential to which the capacitor part C is connected, and the ground potential to which the control part RC is connected (i.e., potential G0). The drive part D2 rotates the rotation shaft of the motor M2 according to a signal output from the control part RC. The drive part D2 is electrically connected to the motor M2 by three conductor wires. The respective conductor wires are connected to the motor terminals of the motor M2. Then, the dynamic brake relay W2 is provided in the conductor wires.

The dynamic brake relay W2 is a relay switch that directly couples between the motor terminals of the motor M2 by directly coupling the respective three conductor wires that electrically connect the drive part D2 and the motor M2 to one another according to the signal output from the control part RC.

For example, the mechanical brake BB2 brakes the rotation of the rotation shaft by friction generated by holding a brake disc attached to the rotation shaft of the motor M2 with brake pads. The mechanical brake BB2 brakes the rotation of the rotation shaft of the motor M2 according to the signal output from the control part RC. Note that the mechanical brake BB2 may brake the rotation of the rotation shaft by another method instead. Further, in FIG. 2, for simplification of the drawing, the lines showing the electrical connection between the control part RC and the mechanical brake BB2 are omitted.

The third motor part 23 is an amplifier-integrated motor having a motor M3, a drive part D3, and a dynamic brake relay W3.

The motor M3 is a servo motor. The motor M3 is driven by the drive part D3. In the state in which the motor M3 is provided in the robot 1, the rotation shaft of the motor M3 is respectively coupled to a reducer V3 that reduces the rotation speed of the rotation shaft and a mechanical brake BB3 that brakes the rotation of the rotation shaft.

The drive part D3 is an amplifier having a drive circuit (motor driver) that drives the motor M3. The drive part D3 is controlled by the control part RC. The respective positive terminals and negative terminals of the respective electrolytic capacitors of the capacitor part C are electrically connected to the drive part D3. Thereby, power is supplied to the drive part D3 from the insulated power supply AD. Further, when the power supply to the robot control apparatus 30 is shut down, power is supplied to the drive part D3 from the respective electrolytic capacitors. Thereby, the drive part D3 is connected to the ground G. That is, the ground potential to which the drive part D3 is connected is the same ground potential as the ground potential to which the insulated power supply AD is connected, the ground potential to which the capacitor part C is connected, and the ground potential to which the control part RC is connected (i.e., potential G0). The drive part D3 rotates the rotation shaft of the motor M3 according to a signal output from the control part RC. The drive part D3 is electrically connected to the motor M3 by three conductor wires. The respective conductor wires are connected to the motor terminals of the motor M3. Then, the dynamic brake relay W3 is provided in the conductor wires.

The dynamic brake relay W3 is a relay switch that directly couples between the motor terminals of the motor M3 by directly coupling the respective three conductor wires that electrically connect the drive part D3 and the motor M3 to one another according to the signal output from the control part RC.

For example, the mechanical brake BB3 brakes the rotation of the rotation shaft by friction generated by holding a brake disc attached to the rotation shaft of the motor M3 with brake pads. The mechanical brake BB3 brakes the rotation of the rotation shaft of the motor M3 according to the signal output from the control part RC. Note that the mechanical brake BB3 may brakes the rotation of the rotation shaft by another method instead. Further, in FIG. 2, for simplification of the drawing, the lines showing the electrical connection between the control part RC and the mechanical brake BB3 are omitted.

The fourth motor part 24 is an amplifier-integrated motor having a motor M4, a drive part D4, and a dynamic brake relay W4.

The motor M4 is a servo motor. The motor M4 is driven by the drive part D4. In the state in which the motor M4 is provided in the robot 1, the rotation shaft of the motor M4 is respectively coupled to a reducer V4 that reduces the rotation speed of the rotation shaft and a mechanical brake BB4 that brakes the rotation of the rotation shaft.

The drive part D4 is an amplifier having a drive circuit (motor driver) that drives the motor M4. The drive part D4 is controlled by the control part RC. The respective positive terminals and negative terminals of the respective electrolytic capacitors of the capacitor part C are electrically connected to the drive part D4. Thereby, power is supplied to the drive part D4 from the insulated power supply AD. Further, when the power supply to the robot control apparatus 30 is shut down, power is supplied to the drive part D4 from the respective electrolytic capacitors. Thereby, the drive part D4 is connected to the ground G. That is, the ground potential to which the drive part D4 is connected is the same ground potential as the ground potential to which the insulated power supply AD is connected, the ground potential to which the capacitor part C is connected, and the ground potential to which the control part RC is connected (i.e., potential G0). The drive part D4 rotates the rotation shaft of the motor M4 according to a signal output from the control part RC. The drive part D4 is electrically connected to the motor M4 by three conductor wires. The respective conductor wires are connected to the motor terminals of the motor M4. Then, the dynamic brake relay W4 is provided in the conductor wires.

The dynamic brake relay W4 is a relay switch that directly couples between the motor terminals of the motor M4 by directly coupling the respective three conductor wires that electrically connect the drive part D4 and the motor M4 to one another according to the signal output from the control part RC.

For example, the mechanical brake BB4 brakes the rotation of the rotation shaft by friction generated by holding a brake disc attached to the rotation shaft of the motor M4 with brake pads. The mechanical brake BB4 brakes the rotation of the rotation shaft of the motor M4 according to the signal output from the control part RC. Note that the mechanical brake BB4 may brakes the rotation of the rotation shaft by another method instead. Further, in FIG. 2, for simplification of the drawing, the lines showing the electrical connection between the control part RC and the mechanical brake BB4 are omitted.

As described above, in the robot 1, the power supply part BA has the insulated power supply (in the example, the insulated power supply AD) that supply power to the drive parts (i.e., the respective drive part D1 to drive part D4) driving the movable unit A, and the drive parts are provided in the movable unit A. Thereby, the robot may be downsized compared to the case where the drive parts are provided with the power supply part BA in the space inside of the support unit B.

In the robot 1, the drive parts (i.e., the respective drive part D1 to drive part D4) and the control part RC are connected to the common ground potential (in the example, potential G0). Thereby, the robot 1 may supply power to both the drive parts and the control part RC from the respective electrolytic capacitors of the capacitor part C.

In the robot 1, the control part RC is provided in (the space inside of) the base B1. Thereby, in the robot 1, the base B1 may be downsized by the size of the drive parts compared to the case where the drive parts (i.e., the respective drive part D1 to drive part D4) and the control part RC are provided in the base B1.

In the robot 1, the power supply part BA is provided in (the space inside of) the first housing B2. Thereby, the base B1 may be downsized by the size of the power supply part BA compared to the case where the power supply part BA and the control part RC are provided in the base B1.

In the robot 1, the movable unit A includes the first arm and the second arm driven by the respective motor parts 2 as the amplifier-integrated motors. Thereby, in the robot 1, the movable unit A may be downsized compared to the case where the robot includes arms driven by motors separately provided from amplifiers.

Operation of Power Supply Circuit when Power Supply to Robot Control Apparatus is Shut Down As below, an operation of the power supply circuit when power supply to the robot control apparatus 30 is shut down will be explained.

When the power supply to the robot control apparatus 30 is shut down, the control part RC of the robot control apparatus 30 operates the main circuit relay MR and cuts off the electrical connection between the insulated power supply AD and the second rectifier DO2. Thereby, the power supply to the motors (i.e., the respective motor M1 to motor M4) of the respective motor parts 2 is shut down and the respective motors rotate the respective rotation shafts of the motors by inertia. The respective motors generate regeneration currents by the rotation. The generated regeneration currents are charged in the respective electrolytic capacitors of the capacitor part C via the drive parts. The regeneration currents charged in the respective electrolytic capacitors of the capacitor part C are supplied to the control part RC to which the power supply from the insulated power supply AD has been shut down through the above described third path.

The control part RC is activated by the currents supplied from the respective electrolytic capacitors of the capacitor part C, stop-controls the motors, at the same time, operates the mechanical brakes (i.e., the respective mechanical brake BB1 to mechanical brake BB4) coupled to the rotation shafts of the motors of the respective motor parts 2, and brakes the rotation of the respective rotation shafts. Note that the method of stop-controlling the motors may be a known method or a method to be developed. Then, the control part RC operates the dynamic brake relays of the motors having the rotation shafts at the rotation speed less than the predetermined speed and stops the rotation shafts of the motors. Thereby, even when the power supply to the robot control apparatus 30 is shut down, the robot 1 may brake the respective motors while suppressing the load on the reducers coupled to the rotation shafts of the respective motors of the robot 1 and, as a result, may suppress reduction of the lives of the reducers.

As described above, in the robot 1, the power supply part (in the example, the power supply part BA) has the insulated power supply (in the example, the insulated power supply AD) that supplies power to the drive parts (in the example, the respective drive part D1 to drive part D4) driving the movable unit (in the example, the movable unit A), and the drive parts are provided in the movable unit. Thereby, the robot 1 may be downsized.

In the robot 1, the power supply part that supplies power equal to or lower than 1 kW to the drive parts driving the movable unit has the insulated power supply, and the drive parts are provided in the movable unit. Thereby, the robot 1 may be downsized by downsizing of the insulated power supply.

In the robot 1, the power supply part is provided in the support unit (in the example, the support unit B) on which the movable unit is provided. Thereby, in the robot 1, the support unit may be downsized by the size of the drive parts compared to the case where the drive parts and the power supply part are provided in the support unit.

In the robot 1, the control part (in the example, the control part RC) is provided in the support unit. Thereby, in the robot 1, the support unit may be downsized by the size of the drive parts compared to the case where the respective drive parts, power supply part, and control part are provided in the support unit.

In the robot 1, the power supply part has the capacitors with the capacity equal to or larger than 1000 μF (in the example, the electrolytic capacitor C1 to electrolytic capacitor C3) that supply power to the drive parts and the control part when the power supply to the drive parts are shut down. Thereby, in the robot 1, even when the power supply to the drive parts is shut down, power may be supplied to the drive parts and the control part from the capacitors.

In the robot 1, the currents are allowed to flow from the capacitors to the control part by the first rectifier (in the example, the first rectifier DO1). Thereby, in the robot 1, the backflow of the currents flowing from the capacitors toward the control part may be suppressed.

In the robot 1, the backflow of the currents flowing from the capacitors to the insulated power supply is prevented by the second rectifier (in the example, the second rectifier DO2). Thereby, in the robot 1, when power supply to the power supply part is shut down, the power may be supplied from the capacitors to the control part more reliably compared to the case where the power supply part does not have the second rectifier.

In the robot 1, the drive parts and the control part are connected to the common ground potential (in the example, the potential G0). Thereby, in the robot 1, power may be supplied to both the drive parts and the control part from the capacitors.

In the robot 1, the control part is provided in the base (in th embodiment, the base B1). Thereby, in the robot 1, the base may be downsized by the size of the drive parts compared to the case where the drive parts and the control part are provided in the base.

In the robot 1, the power supply part is provided in the first housing (in th embodiment, the first housing B2). Thereby, in the robot 1, the base may be downsized by the size of the power supply part compared to the case where the power supply part and the control part are provided in the base.

In the robot 1, the movable unit includes the arm (in the example, the first arm A1 or second arm A2) driven by the amplifier-integrated motors (in the example, the respective motor parts 2). Thereby, in the robot 1, the movable unit may be downsized compared to the case where the unit includes an arm driven by motors separately provided from amplifiers.

As above, the embodiments of the invention are described with reference to the drawings, however, the specific configurations are not limited to the embodiments and changes, replacements, deletions, etc. may be made without departing from the scope of the invention.

The entire disclosure of Japanese Patent Application No. 2016-191266, filed Sep. 29, 2016 is expressly incorporated by reference herein.

What is claimed is:

1. A robot comprising:
a movable unit;
a driver that drives the movable unit;
a power supply part having a capacitor and an insulated power supply, the insulated power supply supplying power to the driver;
a support on which the movable unit is provided; and
a controller that controls the driver,
wherein the driver is provided in the movable unit,
the power supply part is provided in the support,
the controller is provided in the support,
the driver and the controller are connected to a common ground potential, and
the power supply part has a rectifier provided between the capacitor and the controller and allowing a current from the capacitor toward the controller.

2. A robot comprising:
a movable unit;
a driver that drives the movable unit;
a power supply part having an insulated power supply that supplies power to the driver;
a support on which the movable unit is provided; and
a controller that controls the driver,
wherein the driver is provided in the movable unit,
the power supply part is provided in the support,
the controller is provided in the support, and
the power supply part has a capacitor with a capacity equal to or larger than 1000 μF that supplies the power to the driver and the controller when the supply is shut down, wherein the power supply part has a first rectifier provided between the capacitor and the controller and allowing a current from the capacitor toward the controller.

3. The robot according to claim 2, wherein the power supply part has a second rectifier for preventing backflow of a current from the capacitor to the insulated power supply.

4. A robot system comprising:
the robot according to claim 1; and
a robot controller that controls the robot.

5. A robot system comprising:
the robot according to claim 2; and
a robot controller that controls the robot.

\* \* \* \* \*